June 7, 1966  A. EISELE  3,254,415
COMBINED BORE DIAMETER AND CONCENTRICITY GAUGE
Filed Feb. 11, 1963
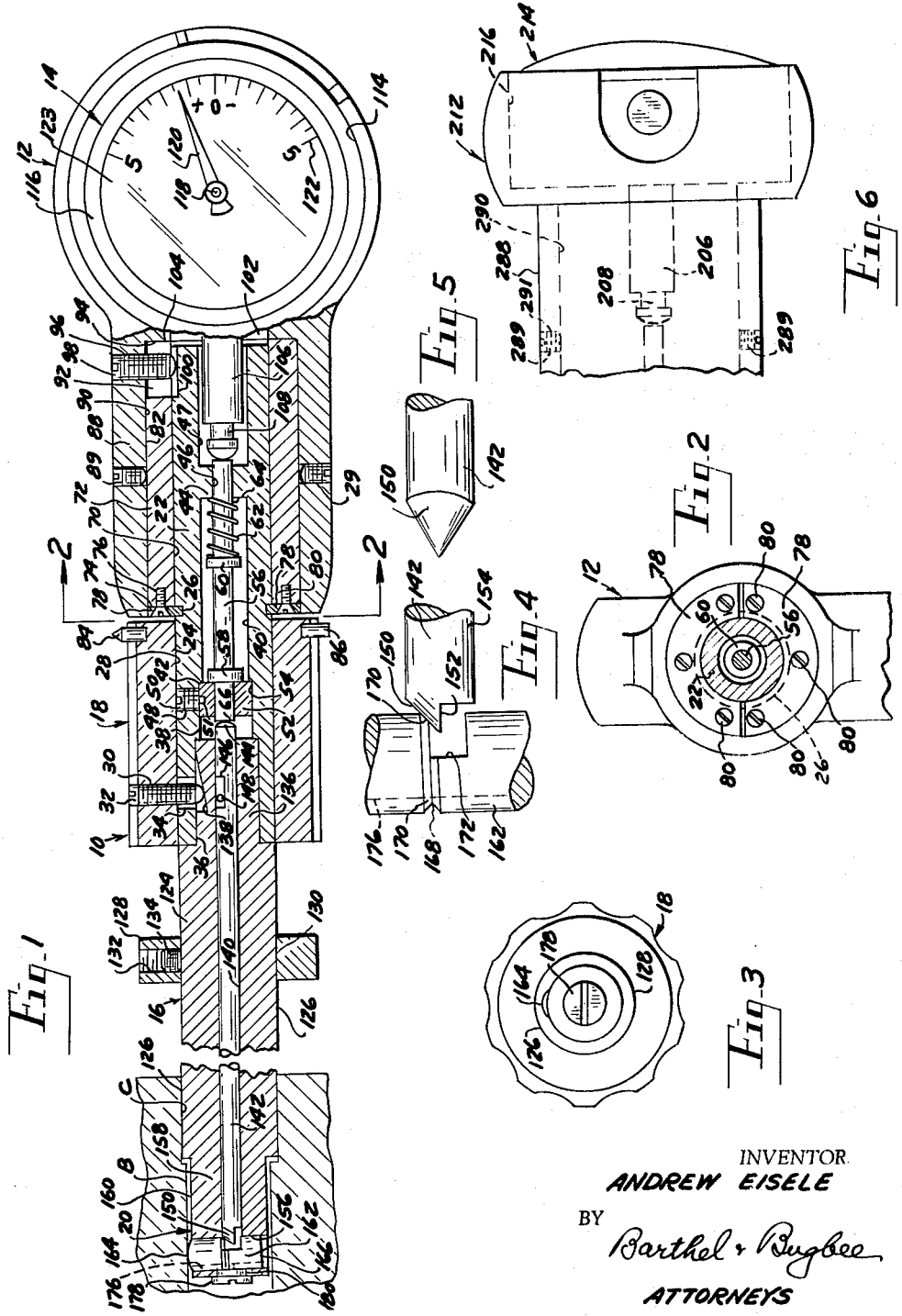
INVENTOR.
ANDREW EISELE
BY Barthel + Bugbee
ATTORNEYS

United States Patent Office 3,254,415
Patented June 7, 1966

3,254,415
COMBINED BORE DIAMETER AND
CONCENTRICITY GAUGE
Andrew Eisele, 15025 Cheyenne Ave., Detroit, Mich.
Filed Feb. 11, 1963, Ser. No. 257,415
9 Claims. (Cl. 33—174)

This invention relates to bore gauges and, in particular to bore diameter and concentricity gauges, namely those gauges employed for measuring the diameters of bores and the concentricity of one bore relatively to an adjacent bore.

One object of this invention is to provide a combined bore diameter and concentricity gauge which is adapted to be used in restricted spaces, is easy to assemble and disassemble and which, by reason of its simple and compact construction, is light in weight and consequently easy to handle by the operator.

Another object is to provide a combined bore diameter and concentricity gauge of the foregoing character which is quickly and easily convertible from the measuring of bore diameters to the measuring of bore concentricity and vice versa, such as by merely tightening or loosening a set screw.

Another object is to provide a combined bore diameter and concentricity gauge having a minimum number of working parts or components and wherein the moving parts are held in assembly by an improved construction which eliminates the danger of components accidentally separating from one another or dropping out of the instrument.

Other objects and advantages of the invention will become apparent during the course of the following description of the accompanying drawings wherein:

FIGURE 1 is a central longitudinal section, partly in side elevation, through a combined bore diameter and concentricity gauge according to one form of the invention, employing an axially-positioned dial indicator;

FIGURE 2 is a cross-section taken along the line 2—2 in FIGURE 1;

FIGURE 3 is a left-hand end elevation of the gauge shown in FIGURE 1;

FIGURE 4 is an enlarged fragmentary side elevation of the measuring pin and forward motion-transmitting rod of the measuring head at the left-hand end of FIGURE 1;

FIGURE 5 is a fragmentary top plan view of the forward motion-transmitting rod shown in FIGURE 4; and FIGURE 6 is a fragmentary side elevation of the right-hand end of the bore gauge of FIGURE 1, showing the use of a transversely-positioned dial indicator thereon.

Referring to the drawing in detail, FIGURE 1 shows a combined bore diameter and concentricity gauge, generally designated 10, according to one form of the invention as consisting generally of a stationary dial indicator holder or stationary handle 12 having a conventional axial type dial indicator 14 mounted thereon. The term "axial type" refers to the fact that the graduated dial of the dial indicator is mounted parallel to the axis of the instrument with its operating plunger entering radially through its rim, in contradistinction to the so-called transverse type of dial indicator shown in FIGURE 6, wherein the graduated dial is disposed transversely to the axis of the instrument with its operating plunger entering through the back of the instrument. Both types of dial indicators are conventional, available upon the open market and well known to those skilled in the mechanical arts, and their details are beyond the scope of the present invention.

The combined bore diameter and concentricity gauge 10 also includes interchangeable bore diameter or concentricity measuring units, generally designated 16, removably mounted in a rotary tubular measuring unit holder or support 22. Each measuring unit 16 at its forward end has a measuring head 20 which is insertable in a workpiece bore, the concentricity of which is to be measured relatively to a workpiece counterbore intended to be coaxial with the workpiece bore, as described below more fully. Mounted upon the dial indicator holder 22 is a rotary tubular handle 18 which contains a bore 28 fitting snugly over the elongated cylindrical external surface 24 of the elongated tubular holder 22, which contains an annular groove 26 intermediate its forward and rearward ends.

The measuring unit holder 22 is drilled and threaded radially at 30 to receive a set screw 32 which passes through a bore 34 in the forward end of the tubular holder 22 into a counterbore or socket 36 which receives the interchangeable measuring units 16 in a manner described below. The counterbore 36 in the forward end portion of the tubular holder 22 opens into an intermediate counterbore 38 of slightly smaller diameter and this in turn opens into a bore 40. The bore 40 extends from a shoulder 42 at its forward end to a partition wall 44 containing a reduced diameter bearing bore 46, which opens into a rearward bore 47.

The forward portion of the tubular holder 22 adjacent the intermediate bore 38 is drilled and threaded radially as at 48 to receive a set screw 50 which enters the intermediate bore 38 so that its tip penetrates the countersink 51 in the periphery of a bearing bushing 52 having a bearing bore 54 of substantially the same diameter as the bearing bore 46. The set screw 50 holds the bearing bushing 52 firmly against the annular shoulder 42 between the counterbore 38 and the bore 40.

Reciprocably mounted in the bearing bores 46 and 54 is a rearward motion-transmitting rod 56 having near its forward end an annular flange or stop collar 58 which in the relaxed condition of the gauge 10 rests against the rearward end of the bearing bushing 52 which serves to limit the forward motion of the rearward motion-transmitting rod 56. Spaced rearward of the stop flange or stop collar 58 is a spring abutment flange or collar 60 which serves as the forward abutment for a helical compression spring 62, the rearward end of which abuts the annular shoulder 64 between the bore 40 and reduced diameter bore 46. The spring 62 normally urges the rearward motion-transmitting rod 56 forward so that the stop flange or collar 58 engages the bearing bushing 52. The rearward motion-transmitting rod 56 has substantially flat forward and rearward ends 66 and 68 respectively.

Surrounding the rearward portion of the tubular holder 22 and having a bore 70 snugly but rotatably engaging the outer cylindrical surface 24 of the support 22 is a sleeve 72, the forward end 74 of which is provided with circumferentially-spaced threaded screw holes 76 disposed parallel to the axis of the bore 70. Abutting the forward end surface 74 of the sleeve 72 are two arcuate or half washers 78 (FIGURE 2) which are drilled in alignment with the screw holes 76 to receive screws 80 by which the half washers 78 are secured to the forward end 74 of the sleeve 72. The half washers 78 have external diameters substantially equal to the diameter of the external surface 82 of the sleeve 72 and internal diameters of substantially the same diameter as the external diameter of the annular groove 26 so as to fit into the latter and prevent axial motion of the tubular holder 22 while permitting rotary motion thereof relatively to the sleeve 72, caused by manually rotating the rotary handle 18.

The rotary handle 18 is drilled at diametrically opposite locations near its rearward end to receive a pointer 84 on one side and a blunt pin 86 diametrically opposite it. These pins 84 and 86 are disposed in the same plane through the axis of the instrument as is the axis of the measuring pin or feeler of the measuring head 20, as described more fully below, so as to indicate to the operator the location at which the measuring head 20 is performing its concentricity measurement.

The dial indicator holder or stationary handle 12 has a tubular extension 88 containing a bore or socket 90 (FIGURE 1) which is of substantially the same diameter as the external cylindrical surface 82 of the sleeve 72 so as to fit snugly thereover, and is removably secured thereto by set screws 89 threaded into threaded radial holes 91. The rearward end of the sleeve 72 is provided with a U-shaped notch 92 extending inward from its rearward end 94. The notch 92 is in the form of an elongated slot permitting adjustment motion of the stationary handle 14 lengthwise relatively to the sleeve 72. The notch 92 is of substantially the same width as a drilled and threaded hole 96 near the rearward end of the tubular extension 88 of the dial indicator handle 12, and a set screw 98 is threaded through the hole 96 and through the notch 92 selectively into or out of engagement with a chordal flat portion 100 at the rearward end of the outer surface 24 of the tubular holder 22. Extending through a hole 102 in the end wall 104 of the handle 12 into the bore 47 is the stem 106 of the dial indicator 14. Reciprocably mounted in the stem 106 is a dial indicator plunger 108, the rounded end 110 of which engages the flat rearward end 68 of the rearward motion-transmitting rod 56 with which it is coaxial.

The stationary handle 12 contains a cup-shaped socket 114 in which is mounted the casing 116 of the dial indicator 14 and into which the hole 102 extends. The casing 116 contains conventional motion-amplifying mechanism (not shown) connecting its plunger 110 to its needle shaft 118. Mounted on the needle shaft 118 is a needle or pointer 120 which registers with graduations 122 upon a dial 123 located within the casing 116. The graduations 122 are in any suitable system of dimensions, such as in thousandths of an inch.

Each bore concentricity measuring unit 16 includes a hollow shaft or stem 124 having an external cylindrical pilot surface 126 corresponding in diameter to the workpiece counterbore having a bore to be measured for concentricity therewith. Adjustably mounted upon the external surface 126 is a stop collar 128 having a bore 130 therethrough snugly but slidably fitting the external surface 126. The stop collar 128 is drilled and threaded radially as at 132 to receive a set screw 134 by which it is adjustably locked at any desired position along the stem 124. The rearward end of the stem 124 is provided with a reduced diameter portion 136 snugly fitting the counterbore 36 in the tubular holder 22 and having an inclined flat-bottomed notch 138 engaged by the set screw 32. The stem or hollow shaft 124 of the measuring unit 16 is provided with a longitudinal bore 140 (FIGURE 1) coaxial with the pilot surface 126 and with the bores 54 and 46. Reciprocably mounted within the bore 140 is a forward motion-transmitting rod 142 having a rounded rearward end 144 engageable with the flat forward end 66 of the rearward motion-transmitting rod 56. A slight distance forward of the rearward end 144, the rod 142 is provided with an elongated flat-bottomed recess 146. The reduced diameter portion 136 of the stem 124 is bored transversely in alignment with the flat-bottomed recess 146 for receiving the opposite end of a pin 148 which passes through the recess 146 against the bottom thereof to prevent rotation of the forward motion-transmitting rod 142.

The forward end of the forward motion-transmitting rod 142 is provided with an inclined transversely-cured tip 150 (FIGURE 4) which subtends an angle of about 47 degrees with the axis of the motion-transmitting rod 142. The lower side of the forward end of the forward motion-transmitting rod 142 is cut away with a right angled notch 152. The transverse curvature of the tip 150 consists of a conical surface, the axis of which coincides with the cylindrical outer surface 154 of the motion-transmitting rod 142. This is accomplished by a grinding operation.

The tip 150 of the forward measuring rod 142 projects into a transversely-disposed measuring pin bore 156 extending through the forward end portion of the hollow shaft or stem 124. The measuring pin bore 156 has its axis tilted at a slight angle of approximately 2 or 3 degrees from a line perpendicular to the axis of the stem 124 and forward motion-transmitting rod 142, so that the axis of the transverse measuring pin bore 156 subtends an angle of about 92 or 93 degrees with the axis of the motion-transmitting rod bore 140. The forward portion 158 of the stem 124 is provided with a reduced diameter cylindrical outer surface 160 adapted to extend into the bore to be measured while the pilot surface 126 fits the counterbore used as the reference bore for concentricity.

Reciprocably mounted within the transverse bore 156 is a feeler or measuring pin 162 having a rounded outer end 164 adapted to contact the bore to be measured and having a rearward end 166 which remains below the mouth of the transverse bore 156. Intermediate its opposite ends 164 and 166, the measuring pin or feeler 162 is provided with a bevel or V-groove 168 (FIGURE 4), the forward bevel side surface 170 of which engages the transversely-curved inclined tip surface 150 of the forward motion-transmitting rod 142. A rectangular notch 172 is formed in the measuring pin 162 immediately below the inclined contact surface 170 so as to extend as far as the bottom 174 of the V-groove 168 and consequently to the bottom of the inclined contact surface 170. The measuring pin 164 is provided with a longitudinal groove 176 into which projects the end of a rotation-preventing screw 178 (FIGURE 1) threaded into a hole 180 in the forward end 182.

In the operation of the gauge 10 as a bore diameter gauge to measure the diameter of a bore B, the operator rotates the set screw 98 radially inward in its threaded bore 96 so as to engage its tip with the flat portion 100 of the tubular holder 22 and thereby clamp or lock latter firmly against rotation relatively to the stationary handle 12. He then inserts in the socket 36 and clamps by means of the set screw 32 the reduced diameter end portion 136 of a suitable bore diameter measuring unit 16 which, for the purposes of measuring bore diameters, does not require the enlarged diameter pilot surface 126. He then moves the measuring head portion 20 of the measuring unit 16 into the bore B, the diameter of which is to be measured whereupon the rounded end 164 of the measuring pin or feeler 162 is pushed inward by its engagement with the surface of the bore B. This action causes the beveled edge 170 of the V-groove 168 to push against the inclined transversely-curved tip 150 of the forward motion-transmitting rod 142, consequently pushing the latter to the right (FIGURES 1 and 4) and with it the rearward motion-transmitting rod 56 and dial indicator plunger 110. The consequent motion of the motion-amplifying mechanism (not shown) within the dial indicator 14 rotates the needle shaft 118 and consequently swings the needle 120 in one direction or the other from the zero position of the graduated scale 122, thereby indicating whether the bore is of the desired diameter or whether it is in excess of or less than the desired diameter and the amount by which it deviates from the desired diameter.

By moving the gauge 10 inward or outward within the bore B, the latter can be gauged for correctness of diameter in an axial direction and thereby detect any undesired tapered condition of the bore B. By rotating the measuring unit 16 by means of the stationary handle 12, any deviation from circularity is immediately indicated on the graduated scale 122 by the swinging of the dial indicator or needle 120. Since the set screw 98 is in its locking position against the flat portion 100 of the tubular measuring unit holder 22, the rotary handle 18 is temporarily prevented from rotating relatively to the stationary handle 12. It will be understood that a variety of measuring units 16 is provided for measuring the diameters of bores of different sizes.

In the operation of the gauge 10 as a bore concentricity gauge, to measure the concentricity of deviation from concentricity of a bore B relatively to a bore or counterbore C (FIGURE 1), the operator rotates the set screw 98 radially outward in its threaded bore 96 so as to disengage its tip from the flat portion 100 of the tubular holder 22 and thereby release the latter and the rotary handle 18 for rotation relatively to the stationary handle 12. He then inserts in the socket 36 and clamps by means of the set screw 32 the reduced diameter end portion 136 of a suitable bore concentricity measuring unit 36 which, for the purpose of measuring bore concentricity, possesses the enlarged diameter pilot surface 126 to fit the master bore or counterbore C with relation to which the concentricity of the bore B is to be gauged. He then inserts the forward end of the selected measuring unit 16 into the bore B and counterbore C with the pilot surface 126 snugly but slidably engaging the counterbore C. As before, contact of the rounded outer end 164 of the measuring pin or feeler 162 with the surface of the bore B pushes the measuring pin 162 inward and consequently shifts the forward and rearward motion-transmitting rod 142 and 56 and the dial indicator plunger 108 rearwardly to the right. Holding the stationary handle 12 against rotation in one hand, he grasps the rotary handle 18 in the other hand and rotates it, causing the rounded end 164 of the measuring pin 162 to trace out a circular path within the bore B. As this occurs, any deviations from concentricity of the bore B relatively to the counterbore C are instantly indicated by a shifting of the dial indicator needle 120 away from the zero mark of the graduated scale 122 and a swinging of the needle 120 to and fro during such rotation. The pointer pin 84 meanwhile indicates to the user the location within the bore B occupied by the measuring pin end 164, thereby showing the momentary contact point therebetween. As a result of this action, the location of any irregularity of the surface of the bore B or any deviation from concentricity relatively to the counterbore C can be quickly and precisely determined.

The slight tilting of the transverse bore 156 within which the measuring pin 162 reciprocates out of perpendicularity with the axis of the motion-transmitting rods 142 and 56 facilitates the smooth and easy operation of the gauge. This construction also minimizes the tendency to tilt the measuring pin 162 which would occur when it and the forward motion-transmitting rod 142 have their axes disposed exactly at right angles to one another.

If the operator desires and finds it more convenient to view the dial indicator from the end of the gauge 10 rather than from the side thereof as in FIGURES 1 to 5 inclusive, he replaces the axial stationary handle 12 and dial indicator 14 of FIGURES 1 to 5 inclusive with the transverse stationary handle 212 and transverse dial indicator 214. This is done by unscrewing the set screws 89 from clamping engagement with the outer surface 82 of the sleeve 72 and also by unscrewing the locking set screw 98. The stationary handle 12 containing the dial indicator 14 is then easily removed by pulling rearwardly upon it with one hand while the handle 18 is held in the operator's other hand. The stationary handle 212 with its transverse dial indicator 214 has a similar tubular extension 288 containing a similar socket 290 for receiving the sleeve 72 and is clamped thereto by similar set screws 289 in radial threaded holes 291. The action of the transverse dial indicator 214 is similar to that described above except that its operating plunger 208 enters the instrument through a stem 206 at the rear of the dial indicator casing 216 rather than at the rim thereof. The remainder of the operation in using the transverse dial indicator 214 in the transverse stationary handle 212 is otherwise the same as that described above for the axial dial indicator 14 and axial stationary handle 12.

What I claim is:

1. A combined bore diameter and concentricity gauge for use with a dial indicator having a reciprocable operating plunger and adapted to selectively measure the diameter of a workpiece bore and its concentricity relatively to a workpiece counterbore, said gauge comprising a dial indicator holder having therein a socket and having means thereon for attaching thereto a dial indicator with its operating plunger disposed in communication with said socket, an elongated hollow supporting structure having a forward portion insertable in the workpiece bore, an intermediate pilot portion adapted to snugly but rotatably fit the workpiece counterbore, and a rearward portion rotatably mounted in said socket;

said supporting structure having a longitudinal bore therethrough communicating at its rearward end with said socket and having in said forward portion a transverse bore communicating with said longitudinal bore, a transversely-reciprocable bore measuring member reciprocably mounted in said transverse bore and having a workpiece bore-contacting feeler portion thereon, said bore measuring member having therein a motion-transmitting edge portion, elongated motion-transmitting means reciprocably mounted in and extending through said longitudinal bore from said motion-transmitting edge into said dial indicator holder socket and adapted to engage the dial indicator plunger, said motion-transmitting means being responsive to the transverse reciprocation of said measuring member for effecting reciprocation of the dial indicator plunger, means for selectively locking and unlocking said supporting structure relatively to said dial indicator holder for selectively preventing and permitting relative rotation therebetween for selectively measuring workpiece bore diameter and concentricity respectively, and means connected between said supporting structure and said dial indicator holder for retaining said dial indicator holder in connected relationship with said supporting structure against relative axial motion therebetween in the unlocked position of said locking means.

2. A combined bore diameter and concentricity gauge, according to claim 1, wherein said retaining means includes an annular retaining portion extending around said supporting structure, and wherein said dial indicator holder includes a tubular portion telescopingly receiving said supporting structure.

3. A combined bore diameter and concentricity gauge, according to claim 2, wherein said annular retaining portion comprises an annular groove in said supporting structure and wherein said retaining means comprises retaining elements secured to said dial indicator holder and extending into said groove.

4. A combined bore diameter and concentricity gauge, according to claim 3, wherein said retaining elements comprise radially-disposed members having arcuate inner edge portions extending into said groove.

5. A combined bore diameter and concentricity gauge for use with a dial indicator having a reciprocable operating plunger, said gauge comprising a dial indicator holder having therein a socket and having means thereon for attaching thereto a dial indicator with its operating plunger disposed in communication with said socket, an elongated hollow supporting structure having a rearward portion rotatably mounted in said socket, said supporting structure having a longitudinal bore therethrough communicating at its rearward end with said socket and having at its forward end a transverse bore communicating with said longitudinal bore, a transversely-reciprocable bore measuring member reciprocably mounted in said transverse bore and having a workpiece bore-contacting feeler portion thereon, said bore measuring member having therein a motion-transmitting edge portion, elongated motion-transmitting means reciprocably mounted in and extending through said longitudinal bore from said motion-transmitting edge into said dial indicator holder socket and adapted to engage the dial indicator plunger, said motion-transmitting means being responsive to the transverse reciprocation of said measuring member for effecting reciprocation of the dial indicator plunger, and means for releasably locking said supporting structure to said dial indicator for selectively preventing and permitting relative rotation therebetween respectively, said supporting structure having an annular retaining portion extending therearound, said dial indicator including a tubular portion telescopingly receiving said supporting structure, retaining means retainingly engaging said retaining portion, and a tubular element secured within said tubular portion around said supporting structure, said retaining means being secured to said tubular element.

6. A combined bore diameter and concentricity gauge for use with a dial indicator having a reciprocable operating plunger, said gauge comprising a dial indicator holder having therein a socket and having means thereon for attaching thereto a dial indicator with its operating plunger disposed in communication with said socket, an elongated hollow supporting structure having a rearward portion rotatably mounted in said socket, said supporting structure having a longitudinal bore therethrough communicating at its rearward end with said socket and having at its forward end a transverse bore communicating with said longitudinal bore, a transversely-reciprocable bore measuring member reciprocably mounted in said transverse bore and having a workpiece bore-contacting feeler portion thereon, said bore measuring member having therein a motion-transmitting edge portion, elongated motion-transmitting means reciprocably mounted in and extending through said longitudinal bore from said motion-transmitting edge into said dial indicator holder socket and adapted to engage the dial indicator plunger, said motion-transmitting means being responsive to the transverse reciprocation of said measuring member for effecting reciprocation of the dial indicator plunger, and means for releasably locking said supporting structure to said dial indicator for selectively preventing and permitting relative rotation therebetween respectively, said locking means comprising a locking seat on said supporting structure and a locking element on said dial indicator holder selectively movable into and out of engagement with said locking seat, said dial indicator holder including a tubular portion telescopingly receiving said supporting structure and a tubular element secured within said tubular portion and having an axially-elongated opening therethrough, said locking element extending through said opening into releasable engagement with said seat.

7. A combined bore diameter and concentricity gauge, according to claim 5, wherein said retaining means is secured to one end of said tubular element.

8. A combined bore diameter and concentricity gauge, according to claim 7, wherein said retaining means comprises a pair of arcuate half-washers secured to said one end of said tubular element.

9. A combined bore diameter and concentricity gauge, according to claim 13, wherein said opening comprises an elongated notch extending axially inward from one end of said tubular element.

References Cited by the Examiner

UNITED STATES PATENTS 2,702,946  3/1955  Boat _____ 33—178

ISAAC LISANN, *Primary Examiner.*

SAMUEL S. MATTHEWS, *Examiner.*